Aug. 11, 1931.   E. C. MOULTON   1,818,241
GEAR SHIFT LEVER LOCK
Filed March 10, 1930   2 Sheets-Sheet 2
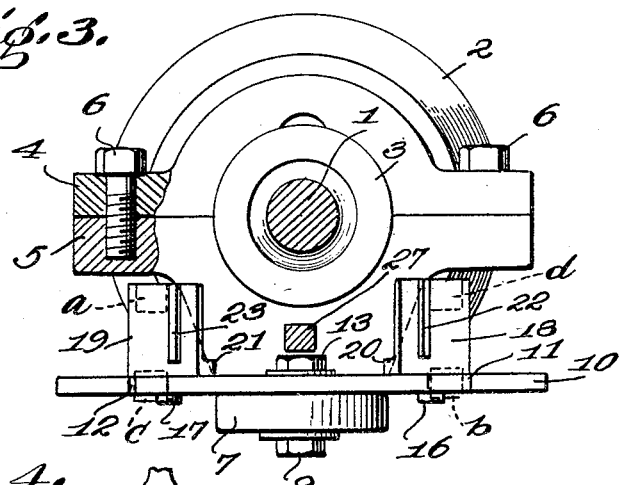
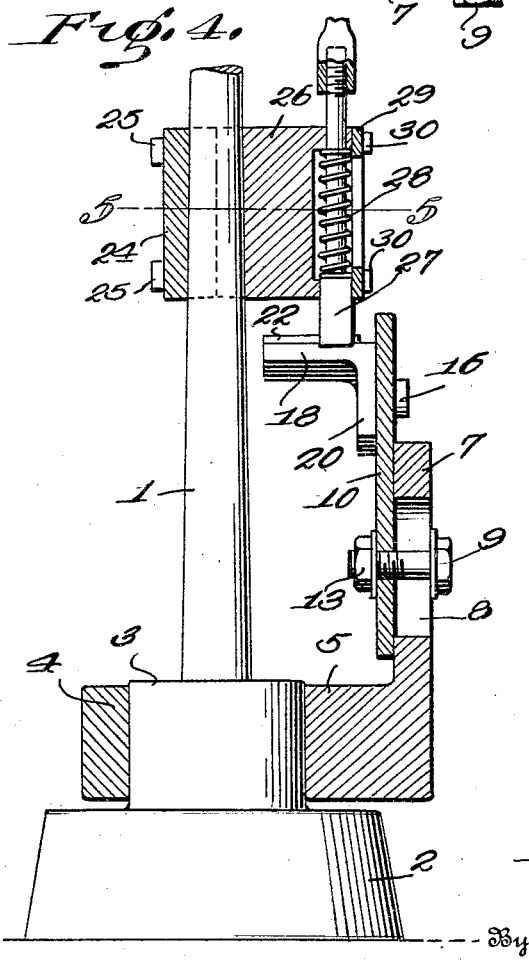
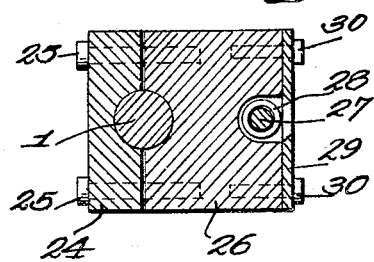
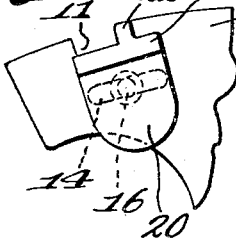
Inventor
Emmons C. Moulton
By
Milans & Milans
Attorneys Patented Aug. 11, 1931

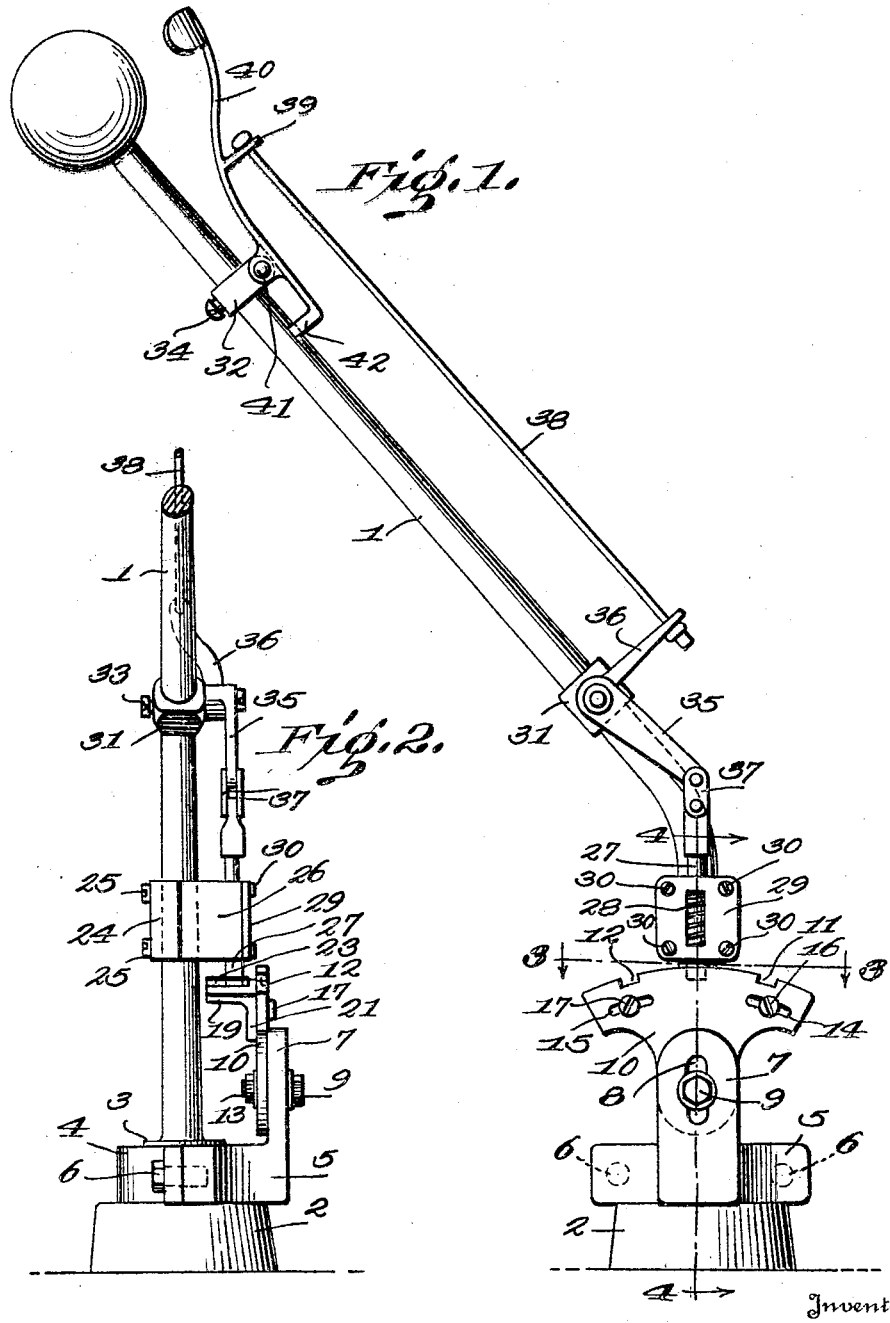

1,818,241

UNITED STATES PATENT OFFICE

EMMONS C. MOULTON, OF PASADENA, CALIFORNIA

GEAR SHIFT LEVER LOCK

Application filed March 10, 1930. Serial No. 434,665.

My invention relates to new and useful improvements in a lock for gear shift levers and while primarily intended for locking the gear shift lever of an automobile or similar vehicle may be used for locking a lever used in connection with various forms of gear shift mechanism.

The principal object of the invention resides in the provision of means for locking or holding a gear shift lever in any of its gear meshing positions and to prevent gears from being accidentally disengaged such as when the vehicle is going up a grade or over rough roads. With the gears positively held in full mesh they will not be accidentally disengaged and will wear evenly thereby preventing noisy gears.

Another object of the invention resides in the provision of novel means whereby the lock and operating mechanism therefore may be readily connected to or disconnected from the lever base and lever and the provision of means for adjusting the parts thereby adapting the lock and operating mechanism for use on levers and bases therefor of various forms.

With the above and other objects in view, which will appear as the description proceeds, my invention consists in the novel details of construction and arrangement of parts, described in the following specification and illustrated in the accompanying drawings, and while I have illustrated and described the preferred embodiments of the invention, as they now appear to me, it will be understood that such changes may be made as will fall within the scope of the appended claims.

In the drawings:—

Fig. 1 is a side elevation.

Fig. 2 is a view at right angles to Fig. 1 looking towards the right of Fig. 1.

Fig. 3 is a horizontal section on the line 3—3 of Fig. 1 looking in the direction of the arrows.

Fig. 4 is a vertical section on the line 4—4 of Fig. 1 looking in the direction of the arrows.

Fig. 5 is a horizontal section on the line 5—5 of Fig. 4; and

Fig. 6 is fragmental detail of a locking member.

In the drawings 1 indicates the gear shift lever of usual well-known form mounted in the base 2 for operation in the usual manner for shifting the gears. In the form of base illustrated there is an upwardly extending reduced portion 3 to receive a clamp constructed of the portions 4 and 5 secured together by means of the screws of bolts 6 or similar means for binding the clamp around the extension 3. The section 5, of the clamp, is provided with an upwardly extending lug or projection 7 having the elongated opening 8 in which operates a bolt 9 for securing a segmental plate 10 having its upper edge curved, as shown more particularly in Fig. 1 of the drawings, and provided with the spaced notches 11 and 12 for a purpose to be later described. A nut 13 is received on the bolt 9 and engages the inner face of the plate 10, as shown more particularly in Fig. 4 of the drawings. By releasing the nut 13 the bolt 9 may be adjusted in the elongated opening 8 for raising and lowering the plate 10. Adjacent its upper edge the plate 10 is provided with the elongated openings 14 and 15 to receive the screws 16 and 17 which are used for adjustably connecting the horizontally extending arms 18 and 19 to the inner face of the plate, these arms 18 and 19 having the depending portions 20 and 21 provided with threaded openings to receive the shanks of the screws 16 and 17 respectively. The arm 18 is provided with the rib or flange 22 and the arm 19 is provided with a similar rib or flange 23, the outer ends of the ribs or flanges terminating short of the inner face of the plate 10, as shown more particularly in Fig. 3 of the drawings. By having the screws 16 and 17 extending through the elongated openings 14 and 15 respectively, the position of the arms 18 and 19 may be adjusted by a swinging movement or by longitudinal movement relative to the plate and preferably the ribs or flanges 22 and 23 will be aligned with the inner edges of the notches 11 and 12, as shown more particularly in Fig. 3 of the drawings, for a purpose which will be later apparent.

Secured to the shift lever 1, by means of the clamp plate 24 and screws 25, is a casting or housing 26 for the sliding bolt 27 which is normally held in lowered position by means of the spring 28. The casting or housing 26 has the plate 29 secured to its outer face by means of the screws 30 or similar means and by removing this plate access may be had to the sliding bolt 27 and spring 28 carried thereby.

Also secured to and carried by the shift lever 1 are the vertically spaced sleeves 31 and 32 which may be adjusted on the lever by means of the set screws 33 and 34. Pivotally connected to the sleeve 31 is a bell crank lever having the arms 35 and 36, the arm 35 being connected to the sliding bolt 27 by means of the links 37. Connected to the arm 36 is one end of a rod 38 the opposite end of the rod being connected to a lug 39 formed on a grip member 40 pivotally connected to the sleeve 32 at 41. This grip member has the inwardly directed extension 42 which normally engages the shift lever 1 to hold the grip member normally in the position shown in Fig. 1 of the drawings. When the upper end of the grip member 40 is grasped and drawn towards the lever 1 the rod 38 will be drawn upwardly to swing the bell crank lever and to raise the sliding bolt 27 against the action of the coiled spring 28.

From the above it is thought that the detail construction of my device will be quite clearly understood and I will now endeavor to more clearly bring out the operation and advantages. It has been found in the operation of motor vehicles that when on a grade or when going over rough ground that gears will be accidentally disengaged or jump into neutral position. As previously stated it is the object of my invention to positively hold the gears in their meshed positions and to prevent accidental disengagement thereof. By having the gears held in full mesh they will wear evenly and noisy gears will be prevented. Normally the parts will be in neutral position, as shown in full lines in the drawings. When the shift lever 1 is swung to the left of the operator and drawn towards him to mesh gears for "first" or "low" speed the bolt 27 will assume the position shown at "a" in dotted lines in Fig. 3 and engage the rib or flange 23 as shown. When the shift lever is operated for shifting gears into "second" or "intermediate" speed, in the usual manner, the bolt 27 will assume the position shown at "b" in dotted lines in Fig. 3 and be received in the notch 11 in the edge of the plate 10. When the shift lever is operated to mesh gears for "high" or "third" speed the bolt 27 will be positioned as shown at "c" in dotted lines Fig. 3 in the notch 12 formed in the top edge of the plate 10. When the shift lever is operated to mesh gears for "reverse" the bolt 27 will be positioned as shown at "d" in dotted lines Fig. 3 to engage the rib or flange 22 as shown.

From the above it will be seen that no matter in which position the shift lever 1 is operated to mesh gears it will be positively held in that position and prevent accidental disengagement of the gears or jumping of the gears into neutral position. It will be understood that when operating the shift lever the hand will grasp the grip member 40 to operate the same in the manner previously described and this operation of the grip member will raise the bolt 27 to allow proper positioning of the lever. After the lever has assumed the gear meshing position the grip member is released and the bolt will drop either into the notches 11 or 12 or into engagement with the ribs or flanges 22 and 23 according to what position the shift lever is moved. It will also be seen that the parts are so adjustable that the lock may be secured to various forms of shifting levers or bases therefor, it being understood that slightly different forms of bases and levers are used on different makes of automobiles.

Having fully described my invention what I claim as new and desire to secure by Letters Patent is:

1. The combination with a gear shift lever of a vertically extending member positioned relative to the lever and having notches in the top edge thereof, arms connected to one face of the member and extending laterally therefrom each arm being provided with a rib, and means carried by the lever and adapted to be engaged in the notches of the member or with the ribs of the arms for holding the lever in any of its gear engaging positions.

2. The combination with a gear shift lever of an adjustable member positioned relative to the lever and having recesses therein, arms carried by the member and each having a rib thereon, and means carried by the lever and adapted to be engaged in the recesses of the member or with the ribs of the arms for holding the lever in any of its gear engaging positions.

3. The combination with a gear shift lever of a member positioned relative to the lever and provided with recesses, adjustable arms carried by the member and each provided with a rib, and means carried by the lever and engageable in the recesses of the member or with the ribs of the arms for holding the lever in any of its gear engaging positions.

4. The combination with a gear shift lever and a base therefor, of a member detachably connected to the base and having an upwardly directed portion, a plate adjustably carried by the upwardly extending portion of the member and provided with recesses, arms adjustably carried by the plate and each provided with a rib, and means carried by the lever and adapted to be engaged in the recesses of the plate or with the ribs of the arms for holding the lever in any of its gear engaging positions.

5. The combination with a gear shift lever of a segmental member having an arcuate shaped upper edge with longitudinally spaced recesses therein, arms connected to one face of the segmental member and extending laterally therefrom, each of the arms having a rib on its upper face extending at right angles to the arc of the upper edge of the member, and means carried by the lever and adapted to be engaged in the recesses of the member or with the ribs of the arms for holding the lever in any of its gear engaging positions.

6. The combination with a gear shift lever of a segmental member positioned relative to the lever and mounted for vertical adjustment and swinging movement said member having longitudinally spaced recesses therein, arms adjustably connected to one face of the member and extending laterally therefrom, a rib on each of the arms, and means carried by the lever and adapted to be engaged with the recesses of the member or with the ribs of the arms for holding the lever in any of its gear engaging positions.

7. The combination with a gear shift lever of a segmental member positioned relative to the lever and mounted for vertical adjustment and swinging movement, said member having an arcuate shaped upper edge with longitudinally spaced recesses therein, arms extending laterally from one face of the member and connected thereto for adjustment longitudinally of the arc of the upper edge thereof, a rib formed on each of the arms, and means carried by the lever and adapted to be engaged in the recesses of the member or with the ribs of the arms for holding the lever in any of its gear engaging positions.

In testimony whereof I hereunto affix my signature.

EMMONS C. MOULTON.